United States Patent [19]

Spillmann, deceased et al.

[11] 4,358,993
[45] Nov. 16, 1982

[54] APPARATUS FOR THERMALLY TREATING A LAYER OF MATERIAL

[75] Inventors: Werner Spillmann, deceased, late of Kilchberg, Switzerland; by Emilie Spillmann, heir, Kilchberg, Switzerland; by Irene Scheffre nee Spillmann, heir, Geneva, Switzerland; by Rolf Spillmann, heir, Pully, Switzerland; Rolf Lehmann, Rudolfstetten, Switzerland

[73] Assignee: Escher Wyss Limited, Zurich, Switzerland

[21] Appl. No.: 171,289

[22] Filed: Jul. 23, 1980

[30] Foreign Application Priority Data

Jul. 25, 1979 [CH] Switzerland .................. 6878/79

[51] Int. Cl.$^3$ ........................... A23L 3/00; A23L 3/26
[52] U.S. Cl. .................. 99/483; 29/113 AD; 34/117; 99/443 C; 99/451; 165/91; 219/388
[58] Field of Search ............... 99/443 C, 451, 483, 99/516, 517, 330, 349–351, 485; 426/241, 520, 524; 165/89–91; 34/117, 120; 29/113 AD, 116 AD; 219/388

[56] References Cited

U.S. PATENT DOCUMENTS

| | | | |
|---|---|---|---|
| Re. 30,302 | 6/1980 | Stanislow | 165/89 |
| 3,414,982 | 12/1968 | Oas | 99/483 X |
| 3,417,483 | 12/1968 | Willard | 99/483 X |
| 3,802,044 | 4/1974 | Spillman et al. | 29/116 X |
| 4,181,743 | 1/1980 | Brumlick et al. | 99/451 X |
| 4,196,689 | 4/1980 | Wolf et al. | 165/91 X |

*Primary Examiner*—Philip R. Coe
*Assistant Examiner*—Timothy F. Simone
*Attorney, Agent, or Firm*—Robert A. Ostmann

[57] ABSTRACT

In an apparatus for treating a layer of material, particularly in a number of successive thermal treatment phases with different treatment temperatures and durations, for carrying out at least two successive treatment phases, there is provided a roller with a roller shell, on to the outer wall of which the layer of material is applied, and which is rotatably mounted about a stationary carrier. Mounted on the carrier are a number of heat-conducting lines at least equal to the number of treatment phases to be carried out. The lines extend parallel to the roller shell and are mounted behind one another in the direction of rotation of the roller shell. They comprise elements which are connected to feed ducts for tempered media and each carry a tempered or cooled medium towards the inner wall of the roller shell.

To ensure that, in particular, a thin layer of material is uniformly applied both in terms of time and in its spatial distribution, an applying roller is provided, and the rollers are constructed as deflection compensating rollers relative to one another in order to form a gap between the rollers which is uniform over its entire length.

15 Claims, 2 Drawing Figures

APPARATUS FOR THERMALLY TREATING A LAYER OF MATERIAL

BACKGROUND OF THE INVENTION

The invention relates to an apparatus for treating a layer of material, particularly in a number of thermal treatment phases succeeding one another in time with different treatment temperatures and durations.

In the food industry, in particular, there are processes in which a product is subjected to a number of successive thermal treatment phases, such as pasteurisation, sterilisation, uperisation, drying, roasting, crystallisation and the like, each being carried out in a layer. Such treatment phases generally differ from one another essentially in the temperature at which they are to be effected and the time they should last and alos the course of the temperature during the treatment phases. In order to effect the thermal treatment phases with satisfactory results, suitable structure of the layer of material is of critical importance, such as a homogeneous particle size which is obtained by preliminary mechanical treatment, e.g. grinding.

Moreover, in the food industry, the material in question is a delicate organic material, and various requirements concerning the flavour, aroma, hygiene, etc., are imposed on the finished product. In addition, the material to be processed is often of varying quality, so that, when the individual treatment phases are carried out, the particular quality of the material in question has to be taken into account, by modifying the treatment parameters, in order to obtain a product of the customary desired quality.

To carry out the individual successive treatment phases, corresponding pieces of apparatus designed specifically for the particular treatment phase to be effected are usually combined one after another to form a production line.

This takes up a relatively large production area and requires additional transporting means for transferring the material to the next piece of apparatus, thus resulting in hygiene problems and heat losses. The number of staff required is also considerable.

SUMMARY OF THE INVENTION

The aim of this invention is to propose an apparatus for treating a layer of material, particularly in a number of successive treatment phases with different treatment temperature and durations, which is space-saving, eliminates the transporting and heat losses between the phases and permits technological flexibility when performing the treatment phases such that the sequence of the treatment phases to be carried out can be altered.

This aim is achieved with an apparatus according to the invention in that, in order to perform at least two successive treatment phases, the apparatus comprises a roller with a roller shell, on to the outer wall of which the layer of material is applied, and which is rotatably mounted about a stationary carrier, whilst a number of heat-conducting lines at least equal to the number of treatment phases to be effected are mounted on the carrier, these lines extending parallel to the axis of the roller shell, being arranged behind one another on the carrier in the direction of rotation of the roller shell and comprising elements which are connected to supply ducts for tempered media and each conveying a tempered medium towards the inner wall of the roller shell.

On the way from a feed point to a removal point, the layer of material carried by the rotating roller shell undergoes the thermal treatment required in the sequence and at the temperature corresponding to the sequence of the heatconducting lines on the carrier, the temperature of the medium fed to the associated line and the circumferential speed of the roller shell. The technological flexibility of the apparatus resides in the fact that if required the temperature of the medium fed to the particular line and/or the circumferential speed of the roller shell can be varied.

In a preferred embodiment, the elements are hydrostatic pressure elements which are arranged side by side to form the particular heat-conducting line and are supplied with a liquid tempered or cooled medium.

This measure ensures a locally limited heat transfer between the tempered or cooled medium and the shell, and through the latter, and also makes it advantageously possible to use a thin-walled roller shell which is guided and clamped on the pressure elements.

Further advantages of the object of the invention are explained in the following more detailed description of an exemplary embodiment, referring to the drawings, wherein:

DESCRIPTION OF THE PREFERRED EMBODIMENT

Figure 1:
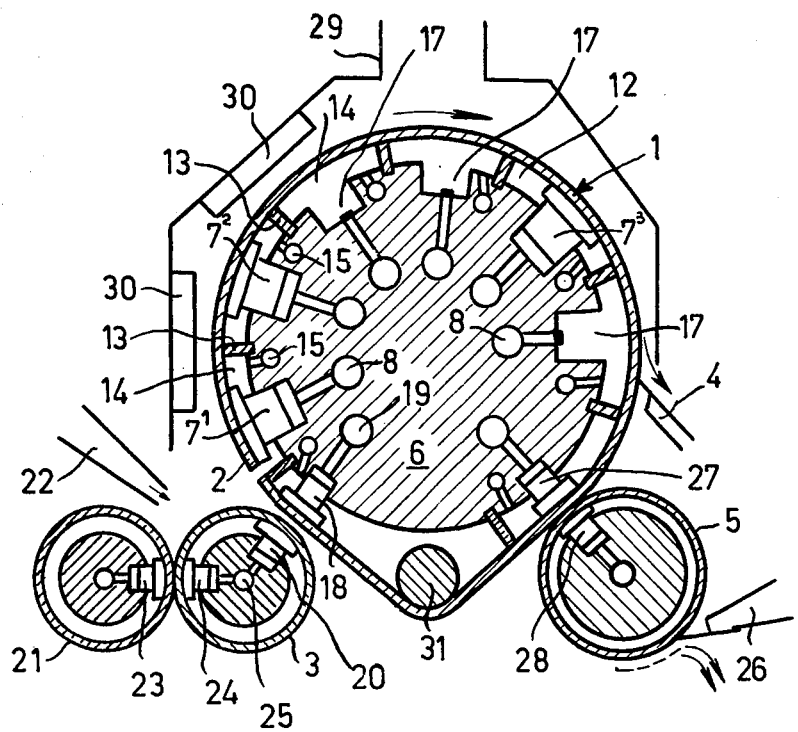
FIG. 1 shows a schematic cross section through an apparatus according to the invention.

A roller 1 is provided for carrying out at least two successive thermal treatment phases. this roller 1 comprises a roller shell 2 on to which a layer of material to be treated is continuously applied by rolling on, advantageously by means of an associated roller 3 as the applying roller. The treated layer of material is removed from the roller shell 2 by means of a scraper 4 or a take-off roller 5.

The roller shell 2 is rotatably mounted about a stationary carrier 6 which is mounted in a stand not shown in the drawings.

Heat-conducting lines are arranged behind one another on the carrier 6 in the direction of rotation of the roller shell 2. They extend over the length of and parallel to the axis of the roller shell 2 or carrier 6 and comprise elements 7 which are connected to feed ducts 8. Through each feed duct is passed a tempered or cooled medium which passes through the connected elements 7 to the inner wall of the roller shell 2.

The elements 7 are hydrostatic pressure elements which are known, for example, from German patent application No. P 22 30 139 and U.S. Pat. No. 3 802 044. A hydrostatic pressure element of this kind is shown in detail in FIG. 2. The elements are arranged side by side along the heat-conducting line along its length and thus form the line. A tempered liquid medium passes into a pressure chamber 9 into the carrier 6 under the associated element 7 and presses it against the inner wall of the roller shell 2. The tempered medium then flows through bores 10 into pressure pockets 11. Here, pressure is built up which forces the element away from the roller shell so that the medium flows into the interstice 12 between the roller shell and the carrier through a gap between the roller shell 2 and the element 1 in the form of a film of liquid. In this way, the roller shell is quided in the radial direction and clamped in the circumferential direction by the pressure elements.

To ensure that the temperature of a tempered medium flowing out of the elements of a heat-conducting line does not thermally affect the operation of a subsequent heat-conducting line in the direction of rotation of the roller shell, a baffle strip 13 is provided behind each heat-conducting line in the direction of rotation. This strip projects upwards from the carrier 6 to the roller shell 2. In this way, compartments 14 are formed in the interstice 12 between the roller shell 2 and the carrier 6, out of which the used tempered medium is discharged through a discharge duct 15 through the carrier 6.

The roller 1 in the apparatus shown has three heat-conducting lines. The elements of the individual lines are designated $7^1$, $7^2$ and $7^3$. The medium to be passed through the feed ducts 8 is tempered, i.e. heated or cooled, outside the roller by means of a suitable device, and accordingly, as it rotates past the individual elements of the heat-conducting lines, the roller shell 2 and thus the layer of material which it carries are also tempered, i.e. heated or cooled, to correspond to the successive thermal treatment phases to be carried out in both the time and temperature.

It it is of advantage, it is possible to connect two or more heat-conducting lines, which should be tempered to the same degree, to a common feed duct.

To prevent heat losses, the feed ducts are provided with insulation in any known manner.

Figure 2:
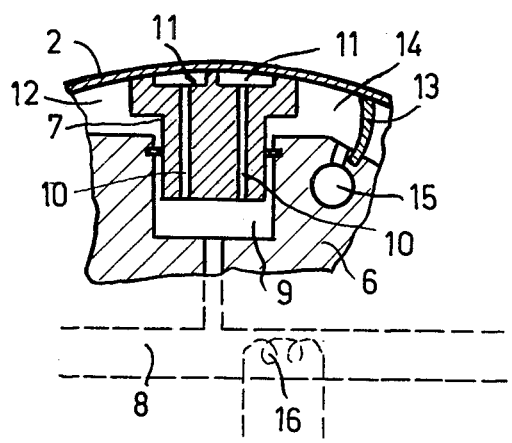
FIG. 2 shows a detail from FIG. 1, on a larger scale.

It is also possible, as shown diagrammatically in FIG. 2, to install heat exchange elements 16 in the feed ducts 8.

As shown, the roller 1 or carrier 6 still have some empty points 17 which are prepared for the use of elements for selectively forming heat-conducting lines at the points of the carrier or elements for guiding or clamping the shell. The necessary feed ducts and connections are also provided.

Thus the technological flexibility of the apparatus is further increased.

The heat-conducting lines may also take other forms, such as, for example, tubes with nozzles through which the inside of the roller shell is supplied with a tempered medium.

For applying the layer of material to the roller 1 by rolling it on, an applying roller 3 is associated therewith. To ensure that the layer of material is uniformly applied to the roller 1 both in time and in spatial distribution, which is a prerequisite for the uniform progress of the treatment phases to be carried out, at least the roller 1 is constructed, relative to the applying roller 3, as a deflection-compensating roller with known hydrostatic support elements 18 resting on the carrier 6. This ensures that a pressing gap remaining constant over its entire length is maintained between the cooperating rollers 1 and 3. If necessary, the liquid pressure medium which is passed through a pressure duct 19 to the support elements 18 arranged side by side in a row in order to exert the rolling forces in the pressing gap may be tempered, so that the row of support elements simultaneously acts as a heat-conducting line.

In the example shown, the applying roller 3 is also constructed as a deflection-compensating roller with a roller shell rotatably mounted about a stationary carrier, and support elements 20. In fact, it is envisaged that any short treatment phase required, such as uperisation in the region of 160° C., be effected on this applying roller 3. In this case, a liquid medium heated to a corresponding temperature is fed into the support elements in this roller 3.

In order to obtain the desired uniform layer of material on the applying roller 3, a pressing roller 21 is mounted in advance of the applying roller, and the material for the layer of material which is to be formed is fed into the gap between the two rollers 3 and 21 by means of an apparatus 22.

Of these two rollers, at least the pressing roller 21 is constructed as a deflection compensating roller with hydrostatic support elements 23 relative to the applying roller 3, to form a pressing gap between these rollers which remains constant over its entire length. This ensures a uniform structure of the layer of material, with a narrow range of particle sizes, for example.

In the example shown, the applying roller 3 opposite the pressing roller 21 is also provided with support elements 24; since it is intended to use the applying roller 3 for carrying out a thermal treatment phase, a liquid pressure medium tempered to a correspondingly high temperature is also passed into the support elements 24. A common feed duct 25 is provided for supplying the two rows of support elements 20 and 24 in the applying roller 3. If necessary, it would be possible to increase the tempering of the roller shell of the applying roller 3 by incorporating an additional heat-conducting line between the rows of support elements provided, which in this case would simultaneously also act as heat-conducting lines.

It should be noted that the hydrostatic pressure elements 7 in the heat-conducting lines and the hydrostatic support elements 18, 20, 23 and 24 and those mentioned elsewhere are constructed on the same principle as the one explained previously with reference to FIG. 2 and is known from the above-mentioned publications.

The layer of material treated on the roller 1 can be removed by means of a scraper 4 or using a take-off roller 5 which is associated with the roller 1 and picks up the layer of material which is then removed by means of a scraper 26. In order to form a pressing gap between the roller 1 and take-off roller 5 which remains constant over its entire length, at least the roller 1 opposite the take-off roller 5 is provided with a row of support elements 27 resting on the carrier 6, this row extending along the gap.

In the example shown, the take-off roller 5 is also constructed, relative to roller 1, as a deflection compensating roller with support elements 28. Indeed, the row of support elements 28 is intended to be used as a heat-conducting line at the same time. Thus, the take-off roller can be used as a cooling roller for subsequent cooling of the treated layer of materials, by passing a liquid, correspondingly tempered pressure medium through the elements 28.

The arrangement described, wherein the roller 1, the applying roller 3 and the take-off roller 5 are each constructed as deflection compensating rollers relative to one another, means that the roller shell 2 of the roller 1 and possibly also the shells of the take-off and applying rollers can be thin-walled, i.e. in those cases where rapid heat transfer through the wall of the shell or low thermal inertia of the shell are advantageous for the particular treatment phases required. It is plain that the roller shell 2 is also guided on the pressure elements $7^1$, $7^2$ and $7^3$, which in turn support the roller shell, albeit with lower pressure, and thus prevent it from being deformed by clamping in the circumferential direction, particularly in the case of a thin-walled roller shell.

It is envisaged that various liquid media capable of being tempered be used in the apparatus. They may be selected according to their specific physical or chemical properties, particularly with respect to the product which is to be treated. It is particularly preferred to use liquids which are chemically related to the product or are inert relative to the product, so that these liquids or vapours thereof can be mixed with the product or come into contact therewith without affecting the product and, more importantly, without damaging it in any way.

Thus, for example, in the treatment of a cocoa composition with the apparatus described, in which the composition is successively homogenised, uperised, sterilised, dried and roasted, vaseline oil is used as a biologically inert liquid medium. However, it would also be possible to use sorbitol or suitable vegetable oils which are related to the cocoa composition as explained above.

The apparatus according to this embodiment by way of example also has a cowling 29 associated with the roller 1 which is intended for carrying out various thermal treatment phases. Together with the roller shell 2 the cowling defines a chamber which is intended for receiving and guiding air and/or process gases or inert gases. The above-mentioned gases, together with any vapours formed during the treatment, are discharged from the cowling through a discharge opening at the top. The gases to be fed in are let in or passed into the chamber between the cowling 29 and the roller shell at the points associated with and required for the treatment phases which are to be carried out on the roller shell. The process or inert gases optionally used will certainly also include water vapour for moistening the layer of material as required.

The cowling 29 can also be used for the attachment of any radiators 30 desired. With these radiators, e.g. infrared radiators, the layer of material applied to the roller shell 2 can additionally be acted upon from this side, i.e. from the outside, so to speak. Ultra-violet radiators may also be used.

An apparatus provided for driving the pressing roller 21 or the roller shell thereof enables this roller or its shell to be driven at a different speed of rotation from the roller shell of the applying roller 3, for example by means of its own associated drive motor, which may be regulatable. This makes it possible to effect additional grinding of the material which is treated in the pressing gap between these rollers. This is for the purpose of obtaining a layer of material having a structure suitable for a subsequent treatment phase.

A similar procedure can also be adopted between the applying roller 3 and the roller following it, to ensure that the layer of material is rolled on to the roller 1 to form the desired uniform layer thickness.

It has been mentioned that, for the purpose of obtaining a rapid heat transfer through the shell 2, in many cases it is particularly important to make the shell thin-walled, consisting of thin sheet steel, for example. To prevent undesirable deformation of such a shell by the action of the elements 7 and ensure that the shell runs accurately along all the rows of elements, a clamping roller 31 which is adjustable in the radial direction is provided between the carrier 6 and the shell 2. By adjusting the clamping roller radially outwardly towards the carrier 6, the shell is clamped in its circumferential direction. The spindle of the clamping roller can be loaded with a constant force, using a spring system, for example, or may also be variably loaded by means of hydraulically actuated means.

Advantageously, the clamping roller may also serve for driving the shell around the carrier. For this, the clamping roller is connected, for example, to a rotary motor (not shown in the drawings). The clamping roller is surrounded by the shell and thus, as it rotates, the shell is driven round the carrier.

What claimed is:

1. Apparatus for thermally treating a layer of material in a plurality of successive, distinct phases comprising a treatment roller including a stationary carrier, and a shell mounted for rotation about the carrier; applying means for delivering a layer of material onto the outer surface of the shell; and a plurality of heat-conducting lines, equal in number to the number of said phases, incorporated in the carrier and extending in the direction of its axis, the lines being spaced circumferentially of the carrier in the direction of rotation of the shell, and each line comprising a feed duct for heat exchange medium, and directing means supplied by the associated feed duct and discharging said medium toward the inner surface of the shell, whereby the shell is contacted sequentially by the heat exchange media of the various lines as it rotates about the carrier so that the overlying layer of material is subjected to successive, distinct thermal treatments.

2. Apparatus as defined in claim 1 in which said directing means of each heat-conducting line comprises a series of hydrostatic pressure elements arranged side-by-side in the carrier, each element having a pressure pocket which faces the inner surface of the shell and which is aupplied with liquid heat exchange medium from the associated feed duct.

3. Apparatus as defined in claim 2 in which said liquid heat exchange medium is chemically related to the material being treated or is inert relative thereto.

4. Apparatus as defined in claim 1 wherein the shell and carrier are spaced radially from each other and bound an intervening space, and which includes circumferentially spaced baffle strips mounted in the carrier and extending radially to the inner surface of the shell to form in said space compartments for collecting the heat exchange media issuing from the various heat-conducting lines; and discharge ducts in the carrier for withdrawing heat exchange media from the compartments.

5. Apparatus as defined in claim 1, 2 or 4 in which said applying means comprises an application roller which coacts with the treatment roller to define a pressing gap in which the layer of material is laid onto the shell; and which includes a series of hydrostatic support elements in the carrier and arranged to support the shell along the pressing gap, and pressure duct means in the carrier for feeding pressure medium to the hydrostatic support elements, whereby the treatment roller serves as a deflection compensating roller with respect to the application roller and thereby maintains the pressing gap constant over its entire length.

6. Apparatus as defined in claim 5 including means for heating the application roller, whereby the material is heated by this roller before it is applied to the shell of the treatment roller.

7. Apparatus as defined in claim 5 including a pressing roller associated with the application roller and defining therewith a pressing gap in which a uniform layer of material is formed on the application roller; and means for feeding material to be treated to the pressing gap bounded by the pressing and application rollers.

8. Apparatus as defined in claim 7 in which the pressing roller comprises a stationary carrier; a shell rotatable about the carrier; a series of hydrostatic support elements in the carrier and arranged to support the shell along the pressing gap bounded by the pressing and application rollers; and pressure duct means for feeding pressure medium to the hydrostatic support elements, whereby the pressing roller serves as a deflection compensating roller with respect to the application roller and thereby maintains the gap between these rollers constant over its entire length.

9. Apparatus as defined in claim 7 including drive means for rotating the application and pressing rollers at different circumferential speeds.

10. Apparatus as defined in claim 1, 2 and 4 including a take-off roller associated with the treatment roller to define a take-off gap located behind the last heat-conducting line in the direction of shell rotation and wherein treated material is removed from the shell.

11. Apparatus las defined in claim 10 including a series of hydrostatic support elements in the carrier and arranged to support the shell along the take-off gap; and pressure duct means in the carrier for feeding pressure medium to the hydrostatic support elements, whereby the treatment roller serves as a deflection compensating roller with respect to the take-off roller and thereby maintains the take-off gap constant over its entire length.

12. Apparatus as defined in claim 1, 2 or 4 including radiation means for directing radiant energy toward the outside surface of the layer of material on the shell.

13. Apparatus as defined in claim 1, 2 or 4 including a cowling which coacts with the shell to define a chamber for receiving and conveying away gasses associated with the thermal treatment.

14. Apparatus as defined in claim 1, 2 or 4 in which the shell is thin-walled or elastic; and including a clamping roller which is parallel with the carrier and engages the inner surface of the shell, the clamping roller being mounted for adjustment in the radial direction and serving to clamp the shell in the circumferential direction.

15. Apparatus as defined in claim 14 including means for driving the clamping roller; and wherein the clamping roller rotates the shell about the carrier.

* * * * *